(12) United States Patent
He et al.

(10) Patent No.: US 8,773,989 B2
(45) Date of Patent: Jul. 8, 2014

(54) ADAPTIVE TRIGGERING SET FOR RELAXED DETERMINISTIC BACK-OFF METHOD

(75) Inventors: Yong He, Beijing (CN); Xiao-Jun Ma, Beijing (CN); Jun Li, Cranbury, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 157 days.

(21) Appl. No.: 13/320,603

(22) PCT Filed: May 18, 2010

(86) PCT No.: PCT/US2010/001465
§ 371 (c)(1),
(2), (4) Date: Nov. 15, 2011

(87) PCT Pub. No.: WO2010/138161
PCT Pub. Date: Dec. 2, 2010

(65) Prior Publication Data
US 2012/0063307 A1    Mar. 15, 2012

(30) Foreign Application Priority Data
May 26, 2009   (EP) .................................... 09305479

(51) Int. Cl.
*H04L 12/26*   (2006.01)
(52) U.S. Cl.
USPC .......................................... 370/230; 370/252
(58) Field of Classification Search
USPC ........................... 370/230, 445, 447, 448, 252
See application file for complete search history.

(56) References Cited

U.S. PATENT DOCUMENTS

2002/0163929 A1* 11/2002 Li et al. .......................... 370/448
2004/0004973 A1*  1/2004 Lee ................................ 370/445
2005/0271076 A1* 12/2005 Ganti et al. ................... 370/448
2009/0074004 A1*  3/2009 Sarkar ........................... 370/448
2009/0274167 A1* 11/2009 Yamazaki et al. ............. 370/445

FOREIGN PATENT DOCUMENTS

WO   WO2009120332   10/2009

OTHER PUBLICATIONS

Anouar et al., "Optimal Constant-Window Backoff Scheme for IEEE 802.11 DCF in Single-Hop Wireless Networks Under Finite Load Conditions", Wireless Peronal Communications, vol. 43, No. 4, Jul. 19, 2007, pp. 1583-1602.
Ma et al., "Contention Window and Transmission Opportunity Adaptation for Dense IEEE 802.11 WLAN Based on Loss Differentiation", Communications, 2008. ICC '08, IEEE International Conference, May 19, 2008, pp. 2556-2560.

(Continued)

*Primary Examiner* — Brian D Nguyen
(74) *Attorney, Agent, or Firm* — Robert D. Shedd; Jerome G. Schaefer

(57) ABSTRACT

A method and system are described including retrieving a sparseness indication, retrieving an indication of a number of failed transmissions, comparing the sparseness indication to an optimal sparseness, comparing the number of failed transmissions to a first threshold, adjusting a size of a set of triggering events responsive to both the first and the second comparison, comparing a data buffer push rate to a data buffer arrival rate, further adjusting the size of the triggering set responsive to the third comparison, determining system fairness, comparing the size of the triggering set to a second threshold and further adjusting the size of the triggering set responsive to one of the determination and a combination of the determination and the fourth comparison.

18 Claims, 6 Drawing Sheets

(56) References Cited

OTHER PUBLICATIONS

Bononi et al., "Runtime Optimization of IEEE 802.11 Wireless Lans Performance", IEEE Transactions on Parallel and Distributed Systems, vol. 15, No. 1, Los Alamitos, CA, pp. 66-80.

Wang et al., "Performance Analysis and Optimization of IEEE 802.11 DCF with Consant Contention Window", Computing, Communication, Control and Management, 2008, CCM '08, ISECS International Colloquium, Aug. 3, 2008, pp. 407-411.

Search Report Dated Jul. 19, 2010.

* cited by examiner

ADAPTIVE TRIGGERING SET FOR RELAXED DETERMINISTIC BACK-OFF METHOD

CROSS-REFERENCE TO RELATED APPLICATIONS

This application claims the benefit, under 35 U.S.C. §365 of International Application PCT/US2010/001465, filed May 18, 2010, which was published in accordance with PCT Article 21(2) on Dec. 2, 2010 in English and which claims the benefit of European patent application No. 09305479.9, filed May 26, 2009.

FIELD OF THE INVENTION

The present invention relates to wireless communication in general and, in particular, to a control method for relaxed deterministic back-off as a means to reduce collisions in media access control (MAC) level communications for multimedia applications over wireless networks.

BACKGROUND OF THE INVENTION

As used herein, "/" denotes alternative names for the same or similar components or structures. That is, a "/" can be taken as meaning "or" as used herein.

The popularity of voice and video applications over mobile computing devices has raised concerns regarding the performance of medium access control (MAC) protocols, which are responsible for allocating shared medium resources to multiple communicating stations and resolving collisions that occur when two or more stations access the medium simultaneously. In the current IEEE 802.11 wireless LANs, the distributed coordination function (DCF) of the MAC protocol layer uses a binary exponential back-off (BEB) algorithm for fundamental channel access. The BEB algorithm mitigates the issue of network collisions by randomizing the timing of medium access among stations that share the communication medium. However, as demonstrated by both practical experience and theoretical analysis, the BEB algorithm has some deficiencies. First, the collision probability for a transmission attempt increases exponentially with the number of active stations in the network, which significantly impairs the network throughput for large-scale networks. Second, the medium access delay cannot be bounded and the jitter is variable, which may not be suitable for multimedia applications. Third, the opportunity for medium access is not fair among stations. That is, a given station may gain access to the communication medium and get served for a long time. This results in other stations having to greatly defer their access to the medium. Moreover, it turns out that the use of doubling the contention window upon failed transmissions appears to give more transmission opportunities to these successful stations.

Some concepts/terms that may benefit the understanding of the present invention are provided. A frame is a unit of data. That is, data can be packaged in packets or frames or any other convenient format. As used herein a frame is used to indicate data packaged in a format for transmission. A back-off round/stage is a procedure in which the back-off slot counter counts down from an initial value (maximum) to zero. When the counter reaches the critical value, a new transmission is attempted. One frame transmission may involve multiple back-off rounds/stages (because of unsuccessful transmission attempts). As used herein a time slot represents a continuous time period during which the back-off slot counter is frozen. It may refer to either a fixed time period (usually several microseconds) sufficient for the physical layer to perform the carrier sensing once, or a varying time period (usually between hundreds of microseconds to several milliseconds, depending on the length of the packet and physical data rate) when a frame is being transmitted over the shared medium. In a network with shared medium, each station freezes or decreases its back-off slot counter based on the resulting status of the physical or virtual carrier sensing of the medium. Hence, because of the shared nature of the medium, the slot count changes are aligned among the stations. The time slot can be used as a basic time unit to make the entire procedure discrete. Positive integers $n=1, 2, 3, \ldots, N$ are used to indicate the $1^{st}, 2^{nd}, 3^{rd}, \ldots, N^{th}$ time slot, and $I_n$ is used to indicate the status of the shared medium at the nth slot, for example, $I_n=1$ when busy and $I_n=0$ otherwise. The back-off slot count of station i at the nth time slot is denoted as $slot_i(n)$.

In Application Serial Number PCT/US09/001,855, a relaxed deterministic back-off (R-DEB) method was described to overcome issues such as backward compatibility and dependability that are inherent in the deterministic back-off (DEB) method. The R-DEB method selects the back-off slot count in as deterministic a way as possible to reduce or avoid network collisions. The R-DEB method also introduces randomness to this procedure to preserve the flexibility and easy deployment feature of the conventional random back-off methods such as the BEB (binary exponential back-off) method. Hence, the R-DEB method made a compromise between the network efficiency and flexibility, and can be viewed as a combination of the DEB algorithm and BEB algorithm. The initial motivation of the R-DEB algorithm was to adapt the deterministic back-off for video transport systems while maintaining backward compatibility with the previous standards.

The R-DEB operates as follows. A back-off round starts when a station resets its back-off slot count slot(n) to the fixed number M (note that here n is a variable on the timeline). Once it is determined by the physical carrier sensing procedure that the sharing medium is idle for a time slot, the station decreases its back-off slot count by one. If this new slot count satisfies the transmission triggering condition (that is, the new slot count equals one of the elements of the triggering set $Q_T$, e.g., slot(n)=k), the node/station/client device/mobile device/mobile terminal will get an opportunity to initiate a data transmission (hence "triggering a transmission"). If no frame is to be sent at this time, the node forgoes the opportunity and continues decreasing its slot count. The result of the data transmission determines whether or not the element k should further remain in the triggering set: if there was a successful transmission then this triggering element remain in the triggering set; if there an unsuccessful data transmission then, with a probability p, a triggering element substitution procedure will be initiated that replaces the old element k with a new one k' from the interval [0, M]. The R-DEB method included a method and apparatus for selecting an element from the interval [0, M−1] for inclusion in the triggering set $Q_T$ to reduce network collisions. It should be noted that a station can be a computer, laptop, personal digital assistant (PDA), dual mode smart phone or any other device that can be mobile.

However, further investigation of the R-DEB method has shown that the size of triggering set $|Q_T|$ has significant effect on system performance. It is easy for one to realize that $|Q_T|$ should be set to a small value (have a small number of triggering elements) when congestion occurs in the network, and $|Q_T|$ should be enlarged when sporadic traffic is observed in the network. The present invention addresses this problem.

First, when a system achieves optimal performance is discussed, then a control method and apparatus to improve the system performance by adaptively adjusting the size of trigger set upon the observed sparseness is described.

SUMMARY OF THE INVENTION

Herein, the throughput of the R-DEB method is analyzed and it is shown that the size of triggering set can be adjusted to achieve optimal system throughput. Based on this analysis, a control method and apparatus to have the size of triggering set controlled around the optimal point, which gives maximized network throughput for the system is described. This control method adjusts the size of triggering set adaptively to the observed network sparseness. In addition, how to adjust the size of triggering set based on some other factors, such as the amount of data in the transmission buffer and network fairness is also discussed. The present invention shows that the triggering set should be adaptively maintained with the evolution of network dynamics to achieve better system performance as well as describing a method and apparatus for adaptively adjusting the triggering set with the evolvement of network dynamics to achieve better system performance.

A method and system are described including retrieving a sparseness indication, retrieving an indication of a number of failed transmissions, comparing the sparseness indication to an optimal sparseness, comparing the number of failed transmissions to a first threshold, adjusting a size of a set of triggering events responsive to both the first and the second comparison, comparing a data buffer push rate to a data buffer arrival rate, further adjusting the size of the triggering set responsive to the third comparison, determining system fairness, comparing the size of the triggering set to a second threshold and further adjusting the size of the triggering set responsive to one of the determination and a combination of the determination and the fourth comparison.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

First, consider a single collision domain, the optimal number of total triggering points in the network to achieve maximum network throughput can be determined. Second, some solutions are described that adaptively adjust the size of each station's triggering set to achieve such optimal throughput.

1. The Maximum Network Throughput

The size of triggering set $Q_T$ should be dynamically tuned to reflect the degree of congestion in the network. Intuitively, if there are many stations contending for the channel simultaneously, a station should decrease the size of $Q_T$ to avoid congestion; on the other hand, if the channel is rarely used during the recent past period, a station can attempt to enlarge the set $Q_T$ to increase the network throughput. Notice that through persistent back-off cycling (or persistent carrier sense on the PHY layer), the channel utilization characteristics over a back-off cycle can be determined. Hence, it is possible for a station to evaluate the network congestion level and make the right decision to increase/decrease the size of $Q_T$.

Consider a network with common service ring m. Suppose that there are totally n triggering points in the network, each point is randomly selected from the window [0, m−1]. Then by the inclusion-exclusion principle, the probability that there are k (0≤k≤n) collisions in a back-off cycle (assume that there are always data to send at each triggering point) can be derived as $$p(k) = \sum_{j=k}^{n} (-1)^{j+k} \binom{n}{j}\binom{j}{k} \frac{m!(m-j)^{n-j}}{(m-j)!m^n} \quad (1)$$

Further suppose that each data frame is of equal payload size l (bytes) and denote $T_s$ and $T_c$ as the elapsed time for a successful data transmission and collision respectively, then the network throughput C can be expressed as $$C = \frac{l \cdot 8 \cdot \sum_{k=0}^{n}(n-k) \cdot p(k)}{m \cdot \sigma + \sum_{k=0}^{n}((n-k) \cdot T_s + k \cdot T_c) \cdot p(k)} \quad (2)$$

Where σ is the duration of a physical time slot. Obviously, C is a function of n, but it is also a function of $T_s$ and $T_c$. In reality, both $T_s$ and $T_c$ depend on the physical data rate and the frame size, thus vary with time. In the problem analysis, it is assumes that all frames are of maximum size 1500 bytes. For a typical IEEE 802.11b parameter setting, $T_s \approx 1.502$ ms and $T_c \approx 1.287$ ms.

Figure 1:
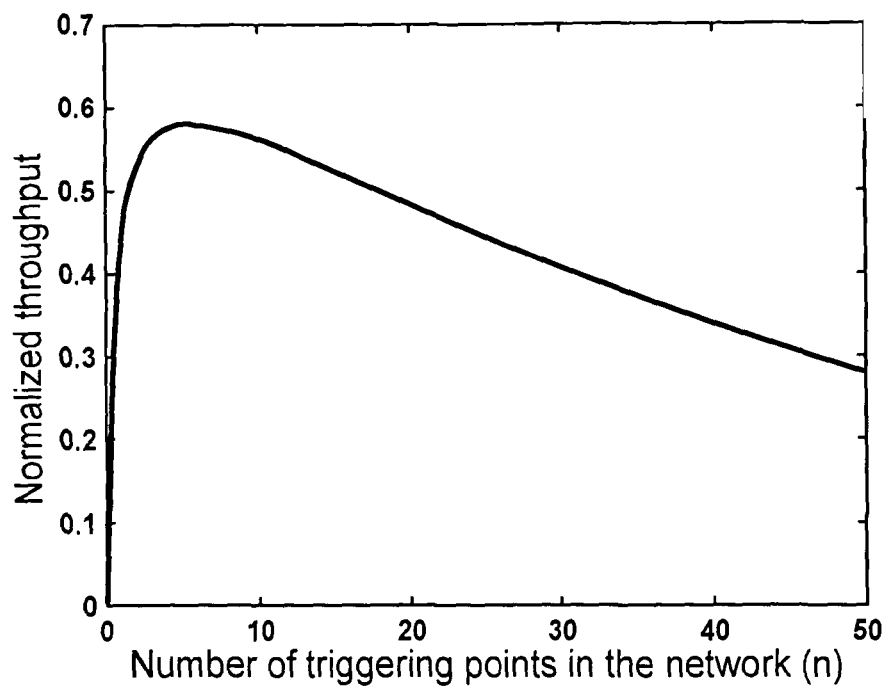
FIG. 1 shows the relationship between throughput and the number of triggering points in a network with service ring size m=50.

FIG. 1 shows the relationship between throughput and the number of triggering points in a network with service ring size m=50. Small n usually leads to underutilization of channel, and large n results in high network collision because there are too many triggering points, both impair the overall throughput. It is easy to determine that the system achieves its maximum throughput at point n=6. When n falls into the interval [3, 15], the system has a 90% of the maximum throughput, which is thought to be a "good enough" performance for this system. Further investigation indicates that, for a general m, choosing n between 0.05×m and 0.3×m is an acceptable choice for most application scenarios, which usually achieves over 90% of the maximum throughput.

2. Adaptive Triggering Set

Given a fixed service ring of size m, values of n can be optimized to give a better system performance in terms of network throughput. How to adjust the size of each station's triggering set is now discussed so as to control the total number of triggering points (n) in the network to maintain good system performance. It should be noted that a station does not know the size of other stations' triggering sets, thus it cannot determine the current value of n. The current value of n is estimated by calculating/determining the number of busy time slots in the last back-off cycle.

As used herein, the sparseness in a back-off cycle is defined as the ratio of the number of idle time slots in last back-off cycle to the size of service ring m. That is, if the back-off records shows that there were a total of h time slots out of m time slot that were sensed to be busy in the last back-off cycle, then the sparseness is given by $$\text{sparseness} = 1 - \frac{h}{m} \quad (3)$$

The sparseness reflects the congestion level of the network. Since h is an observable variable in each back-off cycle, the sparseness can be calculated/determined at the end of each back-off cycle, and then the size of triggering set (denoted as $|Q_T|$) can be adjusted to allow the sparseness to approach the optimal value.

It should be noted that h is a conservative estimation of n, because some busy time slots may involve two or more triggering points in the network (for those time slots in which there has been a collision). In fact, for a given h, n can be estimated by $$\hat{n} = \sum_{i=h}^{m} i \cdot P\{n = i \mid h\} \quad (4)$$

Where P{n=i|h} is derived by the Bayes's formula $$P\{n = i \mid h\} = \frac{P\{h \mid n = i\} \cdot P\{n = i\}}{\sum_{j=h}^{m} P\{h \mid n = j\} \cdot P\{n = j\}} = \frac{P\{h \mid n = i\}}{\sum_{j=h}^{m} P\{h \mid n = j\}} \quad (5)$$

where the inclusion-exclusion principle gives $$p\{h \mid n = i\} = \binom{m}{h}\left(\frac{h}{m}\right)^n \sum_{j=0}^{h}(-1)^j\binom{h}{j}\left(\frac{h-j}{h}\right)^i \quad (7)$$

Here it is assumed that P{h|n=j}=1/(m−h+1), i.e. n takes on values h, h+1, . . . m with equal probability.

Replacing n with $\hat{n}$ in equation (2), a function relationship between the throughput C and observed number of busy time slots h can be established. Note that sparseness is a function of h in (3), hence the correlation between the throughput C and sparseness is also obtained.

Figure 2:
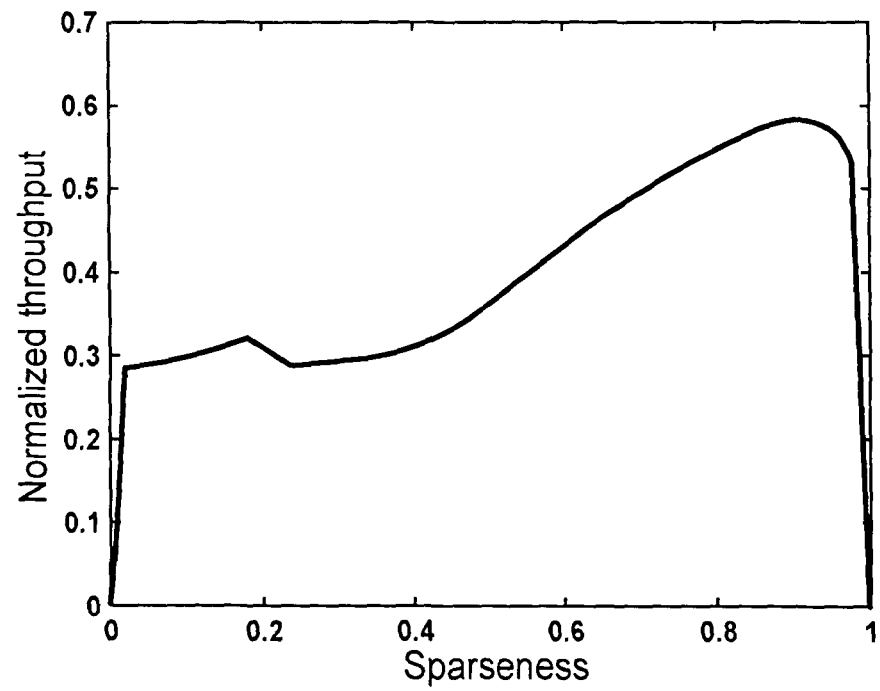
FIG. 2 shows the throughput vs. sparseness with all triggering points being reselected for each round.

FIG. 2 shows the throughput vs. sparseness with all triggering points being reselected for each round. FIG. 2 illustrates how the throughput evolves with the sparseness. The system achieves its maximum throughput for sparseness around 0.9. For sparseness between 0.75 and 0.98, the system has a 90% of the maximum throughput. In contrast, for sparseness smaller than 0.4, the system throughput degrades to about 50% of the maximum throughput. This figure demonstrates that, the sparseness should be logically controlled around the peak point to have a better system performance.

In has been assumed in the past that all triggering points are randomly selected from interval [0, m−1]. Yet in the context of R-DEB, only a subset/portion of the triggering points are supposed to be reselected in a new back-off round—they may suffer collisions in the previous back-off round or it is just the request of this station to enlarge the triggering set. Most of triggering points that have successful data transmissions will remain at their position (in the triggering set). Thus for the R-DEB method, only a subset of triggering points in $Q_T$ need to be reselected in each round and all others just remain where and as they are. One can easily expect a lower collision probability and higher network throughput than in the case discussed previously. Denote p as the percentage of triggering points that need to be reselected in a new back-off round.

Figure 3:
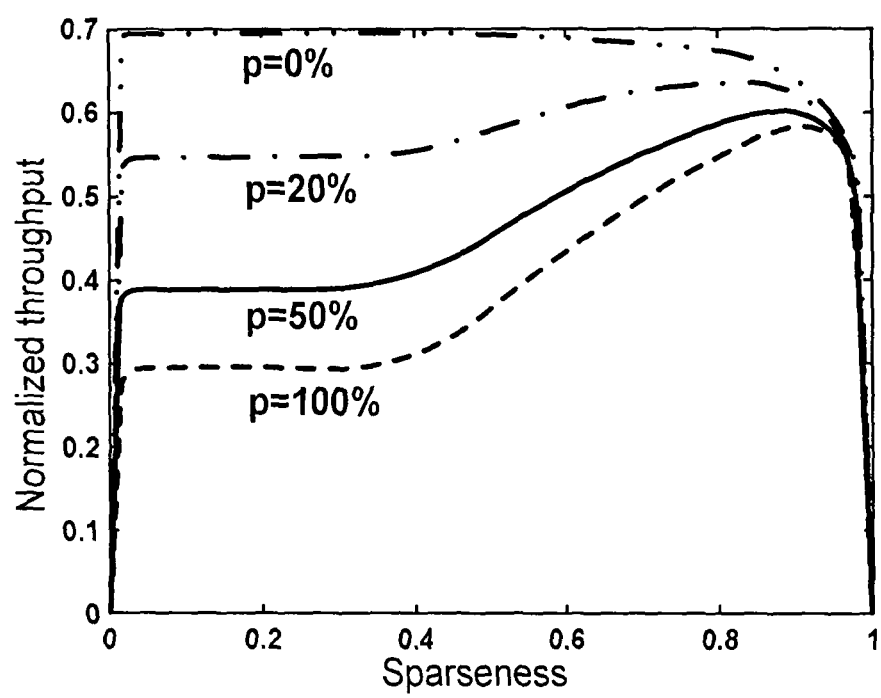
FIG. 3 shows the throughput vs. sparseness with only a percentage p of the triggering points being reselected each round.

FIG. 3 shows the throughput vs. sparseness with only a percentage p of the triggering points being reselected each round. In FIG. 3 the throughput performance for when p takes on values 0, 20%, 50%, 100% respectively is depicted. If p is small, then low sparseness such as 0.5 or 0.6 can achieve even higher throughput than sparseness as high as 0.9. This figure indicates that in some cases when p is small, the triggering set $Q_T$ can be enlarged even when sparseness is low. However, determining p is not trivial since it depends on the carrier sense precision, the presence of hidden terminals and the bit-error-rate. A direct estimation of p is avoided in the control method of the present invention. Instead the present invention uses a trial and error approach.

A control method is described wherein the sparseness is maintained around the optimal point. The method works as follows: When too many idle time slots in the back-off cycle (indicating large sparseness) are observed, then $|Q_T|$ is increased in a multiplicative way, which in turn decreases the sparseness. After the sparseness decreases down to the optimal point for p=100%, increasing the size/magnitude of triggering set $|Q_T|$ is retarded as follows If failed transmissions in last back-off round are experienced, those failed triggering points are removed from $|Q_T|$;

Else if all transmissions in last back-off round are successful, then $|Q_T|$ is additively increased.

The reason for such a strategy is that when the sparseness is large, say sparseness=0.98, the system is far from the optimal point for p=100%, thus a fast start procedure for the increase of $|Q_T|$ can be employed; whereas once the sparseness is beyond the optimal point for p=100%, the size of $Q_T$ should be carefully controlled. If all transmissions in last back-off round were successful, which probably indicates a smaller p, $|Q_T|$ should be increased to achieve higher system performance. However, if data transmission failures occurred in the last back-off round, then p may be large and thus $|Q_T|$ should not be increased further.

The algorithm can be formally described in pseudocode as follows. Here α and β are parameters that control the increase/decrease rate of the triggering set. Similar to the contention window size CWmin/CWmax, the parameters can be configured at start-up or dynamically adjusted by a central coordinator. Such parameters are also sometimes called configuration parameters.

--- p: the percentage of triggering points in $Q_T$ that need to be randomly reselected in each round
$S_{p=100\%}$: the optimal sparseness for p=100%.
For each back-off round do
    S: sparseness observed by a station in last back-off round
    $n_f$: number of transmission failures experienced in last back-off
        If S > $S_{p=100\%}$ Then    /* far from the optimal point */

-continued

```
        |Q_T|←|Q_T|×α, (α>1)
    Else                          /* has reached the optimal point*/
        If n_f=0 Then |Q_T|←|Q_T|+β
            Else |Q_T|←max(|Q_T|-n_f,Q_min)  /* Q_min is the
minimal size of Q_T */
```

It is assumed that the system has been initialized and is running. By the method of the present invention, the sparseness is maintained oscillating around the optimal point and the system throughput is maximized. One should be noted that this algorithm is not the only choice for controlling the change of sparseness. Other algorithms, such as additive increase multiplicative decrease (AIMD), exponential increase exponential decrease (EIED), additive increase additive decrease (AIAD) and multiplicative increase multiplicative decrease (MIMD), including the combination of these algorithms, can also be employed here. Moreover, the term sparseness can be interpreted as other terms, such as congestion level, channel busy ratio, etc. An important aspect of the present invention is that, the number of triggering points maintained by a station should be dynamically controlled based on the estimated network condition, although the control method and the technique to estimate the network congestion level may vary in different environments.

In fact, sparseness is not the only factor that affects the decision of $|Q_T|$. In practice, other factors can be combined to co-determine the change of $|Q_T|$. First, consider the data transmission buffer. It is straightforward to see that when there is more data in the buffer, a larger $|Q_T|$ is needed so as to push the buffered data out, particularly when the data are audio/video data that are delay sensitive. In this case, $|Q_T|$ should be increased. On the other hand, if there are less data arriving in the buffer, $|Q_T|$ should be decreased accordingly. The data buffer arrival rate (in packets per second (pps)) of the incoming data is $$\lambda_{arrive} = \frac{n_a}{T_a} \quad (8)$$

where $n_a$ denotes the number of packets or frames arriving during the observation period $T_a$. On the other hand, the pushing rate (in pps) can be approximated as $$\lambda_{push} = \frac{|Q_T|}{m \cdot \sigma + h \cdot T_s} \quad (9)$$

The control policy and method of the present invention can be additive increase, multiplicative decrease (AIMD), $$\begin{cases} \text{if } \lambda_{push} < \lambda_{arrive}, \text{ increase } |Q_T|: |Q_T| \leftarrow |Q_T| + a & (a > 0) \\ \text{if } \lambda_{push} > \lambda_{arrive}, \text{ decrease } |Q_T|: |Q_T| \leftarrow \frac{|Q_T|}{b} & (b > 1) \end{cases}$$

One of ordinary skill in the art would also realize that here other control methods such as multiplicative increase additive decrease, exponential increase exponential decrease, additive increase additive decrease, multiplicative increase multiplicative decrease or their combination can be applied here.

A second factor that needs to be considered is the fairness performance. The R-DEB control algorithm may lead to an unfair share of network throughput among stations in the sense that once the system reaches a "good" state (optimal throughput performance), there lacks a mechanism/method/means to allow new incomers to get an equal share of the channel resources. That is, users that have been in the network for a period of time will not share with new network users. Even for those stations that have been in the network for a period of time, the channel resources may not be equally shared among them. To overcome this problem, $|Q_T|$ may be adjusted by taking the number of busy time slots used by other stations, i.e. h-$|Q_T|$, into consideration (h is the total busy time slots observed by this station). If h-$|Q_T|$ increased during the last back-off cycle, indicating more triggering points are generated by other stations, $|Q_T|$ should be decreased when $|Q_T|$ is large, or maintained at its current value when $|Q_T|$ is moderate or small (compared to h). Whereas, if h-$|Q_T|$ decreased during the last back-off cycle, $|Q_T|$ can be increased if it is still not at the optimal point.

Figure 4A:
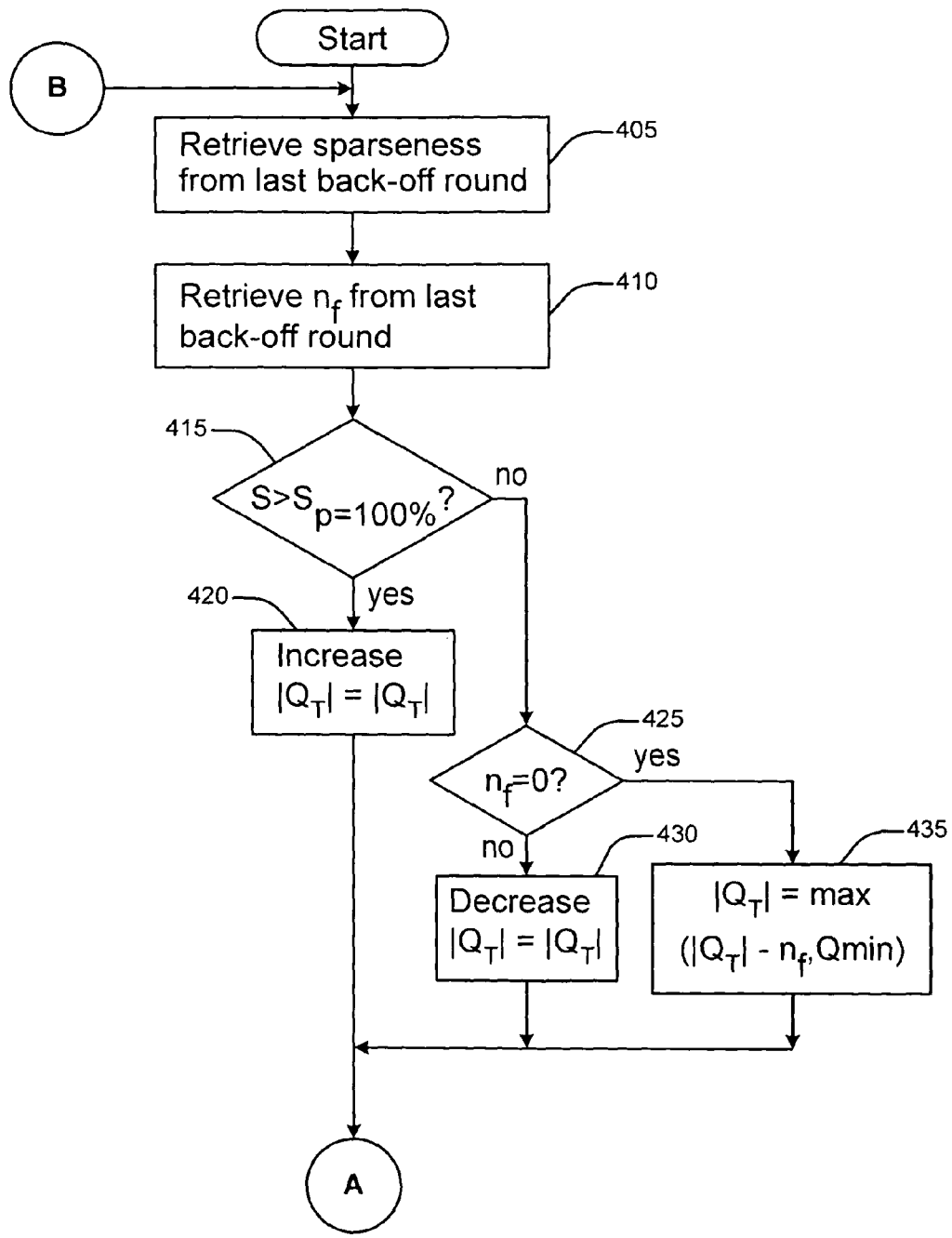
FIGS. 4A-4B together are a flowchart of an exemplary method in accordance with the principles of the present invention.
Figure 4B:
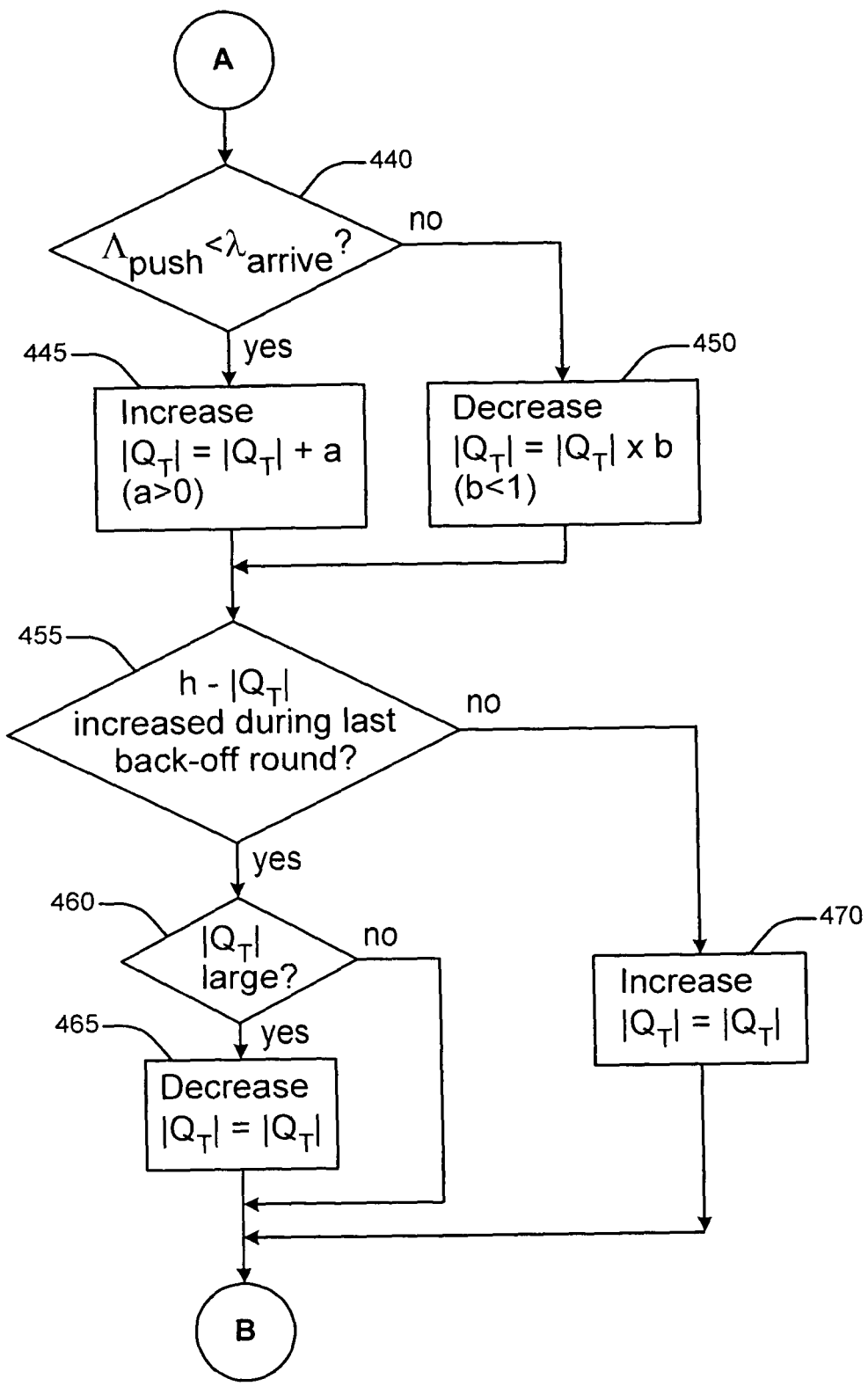

FIGS. 4A-4B together are a flowchart of an exemplary method in accordance with the principles of the present invention. At 405 the sparseness indicator, S, for the last back-off round is retrieved. At 410, the number of failed transmissions, $n_f$, from the last back-off round is retrieved. The options for a sparseness control method can be multiplicative increase additive decrease (MIAD) (as shown in the pseudocode above), additive increase multiplicative decrease (AIMD), exponential increase exponential decrease (EIED), additive increase additive decrease (AIAD), multiplicative increase multiplicative decrease (MIMD) or some combination. It is assumed that the values used for multiplicative increases or decreases as well as additive increases or decreases are selected and configured during initialization or determined heuristically during processing. It is further assumed that the exponential values for EIED are configured during initialization or determined heuristically during processing. Similarly it is assumed that the values for the adjustments to increases for $|Q_T|$ responsive to the condition of the transmission buffers can be configured during initialization or heuristically during processing.

At 415 a test is performed to determine if the sparseness indicator, S, is larger than the optimal point ($S_p$=100%). If S is larger than the optimal point then at 420, $|Q_T|$ is increased. The value of the increase (increase factor) may be selected and configured during initialization or determined heuristically during processing. If S is greater than or equal to the optimal point then a test is performed at 425 to determine if the number of failed transmissions, $n_f$, is equal to 0. If the number of failed transmissions is equal to 0, then $|Q_T|$ is decreased at 430. If the number of failed transmissions is not equal to 0 (by definition this means that it is greater than 0 as one cannot have a number of failed transmissions less than 0), then $|Q_T|$ should be decreased. Still note that the decrease components 425, 430, 435 can be combined to a single decrease component in alternative embodiments (that is, only 430 is retained and 425, 435 are deleted when necessary). The method in the increase component 420 or decrease component 430 can be multiplicative, additive or exponential. But at 435 the value of $|Q_T|$ after the decrease step should be no less than the minimal size of triggering set ($Q_{min}$). Processing then proceeds to 440 described below.

(Flow A) At 440, if the data buffer push rate is less than the data buffer arrival rate then at 445 $|Q_T|$ is increased by a factor of "a" where "a" is greater than 0 ("a" is determined by configuration at initialization or heuristically during processing and is exemplary only). If the data buffer push rate is greater than or equal to the data buffer arrival rate then at 450 $|Q_T|$ is decreased by a factor of "b" where "b" is less than 1

("b" is determined by configuration at initialization or heuristically during processing and is exemplary only). At 455 a test is performed to determine system fairness. This is done by determining if h−|$Q_T$| has increased during the last back-off round. If h−|$Q_T$| has increased during the last back-off round then a test is performed at 460 to determine if |$Q_T$| is large. A "largeness" test can use an arbitrary test point that is configured at initialization or determined heuristically during processing. If |$Q_T$| is large then |$Q_T$| is decreased at 465. The factor by which |$Q_T$| is decreased and the manner by which |$Q_T$| is decreased can be configured at initialization or determined heuristically during processing. Processing then proceeds to 405. If |$Q_T$| (moderate or small) then processing proceeds to 405. If h−|$Q_T$| has decreased during the last back-off round then |$Q_T$| is increased at 470. The factor by which |$Q_T$| is increased and the manner by which |$Q_T$| is increased can be configured at initialization or determined heuristically during processing. Processing then proceeds to 405.

Figure 5:
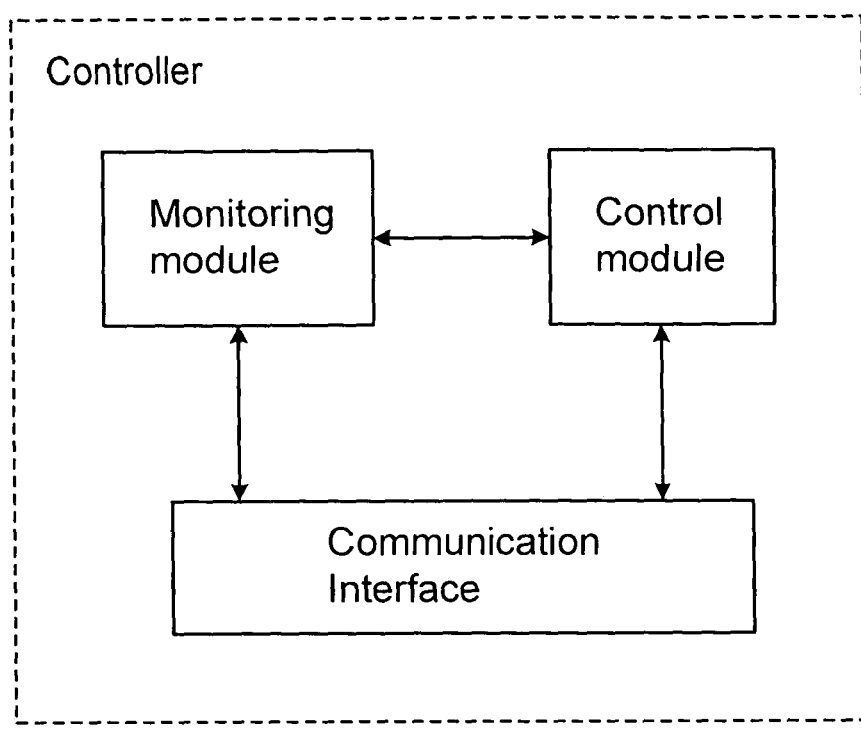
FIG. 5 is a block diagram of an exemplary implementation of the central controller of the present invention.

The methods in the present invention can be implemented in a central controller or implemented in a distributed manner. If the method is implemented in a central controller, the central controller can be hosted in the gateway, a mesh node or a separate node connected to the wireless mesh network. The separate node can be in the mesh network or in the wired network connected to the mesh network. Referring to FIG. 5, which is a block diagram of an exemplary implementation of the central controller of the present invention. The monitoring module collects the network state information from the mesh nodes through the communication module. The control module runs at least one embodiment of the present invention as a routine to control network congestion by adaptively maintaining the size of the triggering set, which contains the events/conditions that permit/allow a mobile device/terminal to transmit data. The control module sends the instructions for the determined triggering set size and the events/conditions to be included in the triggering set. The triggering set size is based in sparseness, the amount of data in transmission buffers of the mobile devices associated with the network and network/system fairness.

Figure 6:
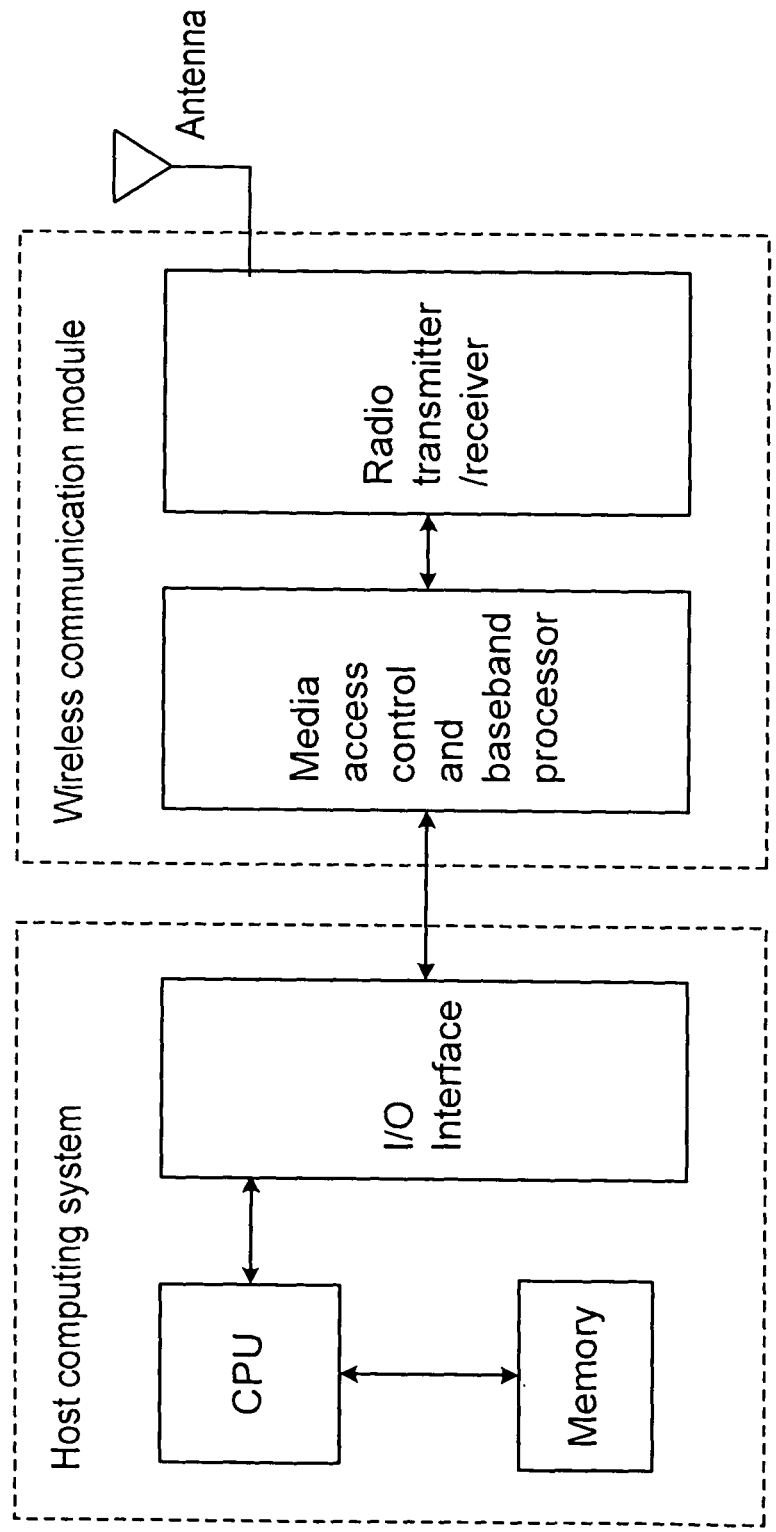
FIG. 6 is a block diagram of an exemplary implementation of the mesh access point/mesh router/mesh node in accordance with the present invention.

Referring to FIG. 6, which is a block diagram of an exemplary implementation of the mesh access point/mesh router/mesh node in accordance with the present invention. The mesh node includes a host computing system and one or more wireless communication modules. The host processing system can be a general-purpose computer or a specific-purpose computing system. The host computing system can include a central processing unit (CPU), a memory and an input/output (I/O) interface. The wireless communication module can include a media access control (MAC) and baseband processor, radio transmitter and/or receiver. The radio transmitter and/or receiver may be a radio transceiver or a separate radio transmitter and radio receiver. An antenna transmits and receives radio signals. The radio transmitter and/or receiver perform radio signal processing. The MAC and baseband processor performs MAC control and data framing, modulation/demodulation, coding/decoding for the transmission/receiving as well as adaptively maintaining the size of the triggering set and the events/conditions included in the triggering set. The wireless communication module network measures sparseness, the amount of data in the transmission buffers of the mobile devices in the network, and system/network fairness and reports the information to the central controller.

In an alternative embodiment, the present invention can be implemented distributively in the mesh nodes. At least one embodiment of the present invention can be implemented as a routine in the host computing system or in the wireless communication module of the mesh node to adaptively maintain the size of the triggering set and the events/conditions included in the triggering set.

In another embodiment, the present invention can be implemented in a combination of centralized and distributed manner. As an example, the sparseness may be determined by the individual mesh nodes and the amount of data in the transmission buffers of the mobile devices may be determined by the central controller.

The block diagrams of FIGS. 5 and 6 may be implemented as hardware, software, firmware, a field programmable gate array (FPGA), an application specific integrated circuit (ASIC), a reduced instruction set computer (RISC) or any combination thereof. Further, the exemplary processes illustrated in the various flowcharts and text above are operationally implemented in either the host processing system or the wireless communication module or a combination of the host processing system and the communication module. The block diagrams thus fully enable the various methods/processes to be practiced in hardware, software, firmware, a field programmable gate array (FPGA), an application specific integrated circuit (ASIC), a reduced instruction set computer (RISC) or any combination thereof.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:
1. A method, said method comprising:
  retrieving a sparseness indication;
  retrieving an indication of a number of failed transmissions;
  comparing said sparseness indication to an optimal sparseness;
  comparing said number of failed transmissions to a first threshold;
  adjusting a size of a set of triggering events responsive to both said first and said second comparison;
  comparing a data buffer push rate to a data buffer arrival rate;

further adjusting said size of said triggering set responsive to said third comparison;
determining system fairness;
comparing said size of said triggering set to a second threshold; and
further adjusting said size of said triggering set responsive to one of said determination and a combination of said determination and said fourth comparison.

2. The method according to claim 1, wherein said first threshold is 0.

3. The method according to claim 1, wherein said optimal sparseness is between 0.75 and 0.98.

4. The method according to claim 1, wherein said first adjustment is one of an increase and a decrease.

5. The method according to claim 4, wherein said increase is one of additive, multiplicative and exponential and wherein said decrease is one of additive, multiplicative and exponential.

6. The method according to claim 1, wherein said second adjustment is one of an increase and a decrease.

7. The method according to claim 6, wherein said increase is additive by a factor greater than 0 and wherein said decrease is multiplicative by a factor less than 1.

8. The method according to claim 1, wherein said fairness is determined by calculating a quantity of a number of busy time slots minus said size of said triggering set.

9. The method according to claim 1, wherein said third adjustment is one of an increase and a decrease.

10. An apparatus comprising:
means for retrieving a sparseness indication;
means for retrieving an indication of a number of failed transmissions;
means for comparing said sparseness indication to an optimal sparseness;
means for comparing said number of failed transmissions to a first threshold;
means for adjusting a size of a set of triggering events responsive to both said first and said second comparison;
means for comparing a data buffer push rate to a data buffer arrival rate;
means for further adjusting said size of said triggering set responsive to said third comparison;
means for determining system fairness;
means for comparing said size of said triggering set to a second threshold; and
means for further adjusting said size of said triggering set responsive to one of said determination and a combination of said determination and said fourth comparison.

11. The apparatus according to claim 10, wherein said first threshold is 0.

12. The apparatus according to claim 10, wherein said optimal sparseness is between 0.75 and 0.98.

13. The apparatus according to claim 10, wherein said first adjustment is one of an increase and a decrease.

14. The apparatus according to claim 13, wherein said increase is one of additive, multiplicative and exponential and wherein said decrease is one of additive, multiplicative and exponential.

15. The apparatus according to claim 10, wherein said second adjustment is one of an increase and a decrease.

16. The apparatus according to claim 15, wherein said increase is additive by a factor greater than 0 and wherein said decrease is multiplicative by a factor less than 1.

17. The apparatus according to claim 10, wherein said fairness is determined by calculating a quantity of a number of busy time slots minus said size of said triggering set.

18. The apparatus according to claim 10, wherein said third adjustment is one of an increase and a decrease.

* * * * *